(12) United States Patent
Arai (10) Patent No.: US 9,562,460 B2
(45) Date of Patent: Feb. 7, 2017

(54) MOTOR GRADER (71) Applicant: KOMATSU LTD., Tokyo (JP)

(72) Inventor: Yuki Arai, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/125,410

(22) PCT Filed: Dec. 26, 2012

(86) PCT No.: PCT/JP2012/083622
§ 371 (c)(1),
(2) Date: Dec. 11, 2013

(87) PCT Pub. No.: WO2014/097493
PCT Pub. Date: Jun. 26, 2014

(65) Prior Publication Data
US 2014/0311132 A1    Oct. 23, 2014

(30) Foreign Application Priority Data

Dec. 20, 2012 (JP) .................. 2012-278013

(51) Int. Cl.
*F01N 3/00*    (2006.01)
*F01N 3/20*    (2006.01)
(Continued)

(52) U.S. Cl.
CPC ............. *F01N 3/208* (2013.01); *B60K 13/04* (2013.01); *B60K 15/063* (2013.01); *E02F 3/764* (2013.01);
(Continued)

(58) Field of Classification Search
CPC .................. B60K 13/04; B60K 15/063; B60K 2015/0638; E02F 3/764; E02F 3/7645; E02F 3/765; E02F 3/7654; E02F 9/0866; E02F 9/0883; F01N 3/208; F01N 2610/02; F01N 2610/1413; B60Y 2200/411
(Continued)

(56) References Cited

U.S. PATENT DOCUMENTS 1,903,968 A  *  4/1933  Hosmer .................. B62D 49/00
                                                    180/337
2,118,810 A  *  5/1938  Fageol .................... B62D 47/02
                                                    105/133
(Continued)

FOREIGN PATENT DOCUMENTS

CN    102444148 A    5/2012
JP    2009-184558 A  8/2009
(Continued)

OTHER PUBLICATIONS

The Chinese Office Action for the corresponding Chinese application No. 201280028482.0, issued on Jun. 5, 2014.
(Continued)

*Primary Examiner* — Thomas Denion
*Assistant Examiner* — Matthew T Largi
(74) *Attorney, Agent, or Firm* — Global IP Counselors, LLP (57) ABSTRACT

A motor grader includes an engine, a power transmission apparatus, a selective catalytic reduction apparatus, a fuel tank and a reducing agent tank. The power transmission apparatus is configured to transmit power from the engine. The selective catalytic reduction apparatus is configured to process exhaust from the engine. The fuel tank is configured to retain fuel. The reducing agent tank is configured to retain a reducing agent. The fuel tank is arranged so as to at least partially overlap with the engine in a planar view. The fuel tank is arranged between the power transmission apparatus (Continued)

and the reducing agent tank in a vehicle front to back direction.

24 Claims, 5 Drawing Sheets

(51) Int. Cl.
  *E02F 3/76* (2006.01)
  *E02F 9/08* (2006.01)
  *B60K 13/04* (2006.01)
  *B60K 15/063* (2006.01)

(52) U.S. Cl.
  CPC ............. *E02F 3/765* (2013.01); *E02F 3/7645* (2013.01); *E02F 3/7654* (2013.01); *E02F 9/0866* (2013.01); *E02F 9/0883* (2013.01); *B60K 2015/0638* (2013.01); *B60Y 2200/411* (2013.01); *F01N 2610/02* (2013.01); *F01N 2610/1413* (2013.01)

(58) Field of Classification Search
  USPC .......................................... 60/286, 295, 297
  See application file for complete search history.

(56) References Cited

U.S. PATENT DOCUMENTS

| | | | | |
|---|---|---|---|---|
| 2,262,497 A * | 11/1941 | Holesworth | .......... | E01C 23/225 15/50.1 |
| 4,738,459 A * | 4/1988 | Nakamura | ............. | B62D 7/142 180/409 |
| 4,955,455 A * | 9/1990 | Albright | ................. | B60K 11/00 180/291 |
| 5,285,863 A * | 2/1994 | Miki | ....................... | B60K 11/06 180/68.2 |
| 6,205,665 B1 * | 3/2001 | Anderson | ............ | B62D 21/186 180/291 |
| 6,267,062 B1 * | 7/2001 | Hamilton, Jr. | ............ | B61C 7/04 105/26.05 |
| 6,543,562 B1 * | 4/2003 | Repko | ....................... | E02F 3/80 180/54.1 |
| 6,938,928 B2 * | 9/2005 | Pfohl | ..................... | B60K 15/04 180/314 |
| 8,820,247 B1 * | 9/2014 | Claussen | ................. | B61O 5/00 105/35 |
| 8,833,501 B2 * | 9/2014 | Kleinhenz et al. | ........... | 180/309 |
| 2002/0043414 A1 * | 4/2002 | Matsuda | ................ | B60K 37/00 180/90 |
| 2006/0091832 A1 * | 5/2006 | Donnelly | .................. | B60L 9/22 318/108 |
| 2009/0094968 A1 * | 4/2009 | Ikegami et al. | ................ | 60/310 |
| 2009/0277156 A1 * | 11/2009 | Hodgson | ................ | F01N 3/2066 60/274 |
| 2010/0312445 A1 * | 12/2010 | Bogema et al. | ................. | 701/70 |
| 2011/0005853 A1 * | 1/2011 | Kamiya | .................. | B60K 13/04 180/296 |
| 2011/0061373 A1 * | 3/2011 | Zimmerman et al. | .......... | 60/286 |
| 2012/0067660 A1 | 3/2012 | Kashu et al. | | |
| 2012/0067661 A1 * | 3/2012 | Kashu et al. | ................. | 180/309 |
| 2012/0174566 A1 * | 7/2012 | Yamashita et al. | ............. | 60/295 |
| 2012/0220420 A1 * | 8/2012 | Ohno | ....................... | B60K 6/48 477/5 |
| 2013/0071295 A1 * | 3/2013 | Terakawa | .............. | E02F 9/0858 422/168 |

FOREIGN PATENT DOCUMENTS

| | | |
|---|---|---|
| JP | 2011-529538 A | 12/2011 |
| WO | 2011/152306 A1 | 12/2011 |

OTHER PUBLICATIONS

International Search Report for the corresponding international application No. PCT/JP2012/083622, issued on Apr. 16, 2013.

\* cited by examiner

MOTOR GRADER

CROSS-REFERENCE TO RELATED APPLICATIONS

This application is a US National stage application of International Application No. PCT/JP012/083622, filed on Dec. 26, 2012. This U.S. National stage application claims priority under 35 U.S.C. §119(a) to Japanese Patent Application No. 2012-278013, filed in Japan on Dec. 20, 2012, the entire contents of which are hereby incorporated herein by reference.

BACKGROUND

Filed of the Invention

The present invention relates to a motor grader.

Description of the Related Art

In recent years, the mounting of an exhaust processing apparatus for processing exhaust onto a motor grader has become desirable. The exhaust processing apparatus is connected to an engine through a connecting pipe in order to process the exhaust from the engine. A selective catalytic reduction apparatus may be used as the exhaust processing apparatus. The selective catalytic reduction apparatus reduces the nitrogen oxide (NOx) in the exhaust.

The selective catalytic reduction apparatus processes the exhaust using a reducing agent such as aqueous urea. As a result, it is necessary to arrange a reducing agent tank which retains the reducing agent in the motor grader. However, there is a possibility that the reducing agent may freeze in a low temperature environment. Accordingly, it is desirable for the reducing agent tank to be arranged to be kept at a temperature where freezing does not occur. For example, in the hydraulic excavator according to Japan Patent Laid-open Patent Publication No. 2009-184558, a reducing agent tank is arranged inside a counterweight which is arranged close to an engine room in the rear section of a vehicle.

SUMMARY

Due to the arrangement of the reducing agent tank described above, the temperature of the reducing agent is increased and it is possible to suppress freezing. However, since the reducing agent tank described above is arranged in a space where the periphery is surrounded, there is a possibility that the temperature of the reducing agent will be excessively increased and change into a different substance with the passing of time.

An object of the present invention is to provide a motor grader where it is possible to suppress an excessive increase and an excessive decrease in the temperature of the reducing agent.

A motor grader according to a first aspect is provided with an engine, a power transmission apparatus, a selective catalytic reduction apparatus, a fuel tank, and a reducing agent tank. The power transmission apparatus transmits power from the engine. The selective catalytic reduction apparatus processes exhaust from the engine. The fuel tank retains fuel. The reducing agent tank retains a reducing agent. The fuel tank is arranged so as to at least partially overlap with the engine in planar view. The fuel tank is arranged between the power transmission apparatus and the reducing agent tank in the vehicle front and back direction.

A motor grader according to a second aspect is the motor grader according to the first aspect where the front and back length of the fuel tank is longer than the front and back length of the reducing agent tank.

A motor grader according to a third aspect is the motor grader according to the first or second aspect where the reducing agent tank is arranged behind the fuel tank. The power transmission apparatus is arranged in front of the fuel tank.

A motor grader according to a fourth aspect is the motor grader according to the first or second aspect where the reducing agent tank is arranged in front of the fuel tank. The power transmission apparatus is arranged behind the fuel tank.

A motor grader according to a fifth aspect is the motor grader according to any of the first to fourth aspects further provided with a connecting pipe and a reducing agent ejection apparatus. The connecting pipe is connected to the selective catalytic reduction apparatus and the exhaust from the engine passes through the connecting pipe. The reducing agent ejection apparatus is attached to the connecting pipe and ejects the reducing agent from the reducing agent tank into the connecting pipe. The connecting pipe and the reducing agent ejection apparatus are arranged between the engine and the reducing agent tank in the vehicle front and back direction.

In the motor grader according to the first aspect, the fuel tank is arranged between the power transmission apparatus and the reducing agent tank in the vehicle front and back direction. In addition, the fuel tank is arranged so as to at least partially overlap with the engine in planar view. Accordingly, at least a portion of the fuel tank in the vehicle front and back direction is positioned between the engine and the reducing agent tank. As a result, the reducing agent tank is arranged to be separated from the engine. Due to this, it is possible to suppress an excessive increase in the temperature of the reducing agent. In addition, it is possible to suppress an excessive decrease in the temperature of the reducing agent using the heat from the fuel tank. Furthermore, the reducing agent tank and the power transmission apparatus are arranged on sides which are opposite to each other with regard to the fuel tank. As a result, it is possible to avoid the power transmission apparatus becoming an obstacle to the layout of the reducing agent tank.

In the motor grader according to the second aspect, the front and back length of the fuel tank is longer than the front and back length of the reducing agent tank. As a result, the fuel tank is arranged to be further separated from the engine. Due to this, it is possible to suppress an excessive increase in the temperature of the reducing agent.

In the motor grader according to the third aspect, the fuel tank is arranged to be separated from the engine to the rear. Due to this, it is possible to suppress an excessive increase in the temperature of the reducing agent.

In the motor grader according to the fourth aspect, the fuel tank is arranged to be separated from the engine to the front. Due to this, it is possible to suppress an excessive increase in the temperature of the reducing agent.

In the motor grader according to the fifth aspect, the connecting pipe and the reducing agent ejection apparatus are arranged between the engine and the reducing agent tank in the vehicle front and back direction. Due to this, it is possible to shorten the length of the hose which connects the reducing agent tank and the reducing agent ejection apparatus.

DETAILED DESCRIPTION OF EMBODIMENT(S)

Figure 1:
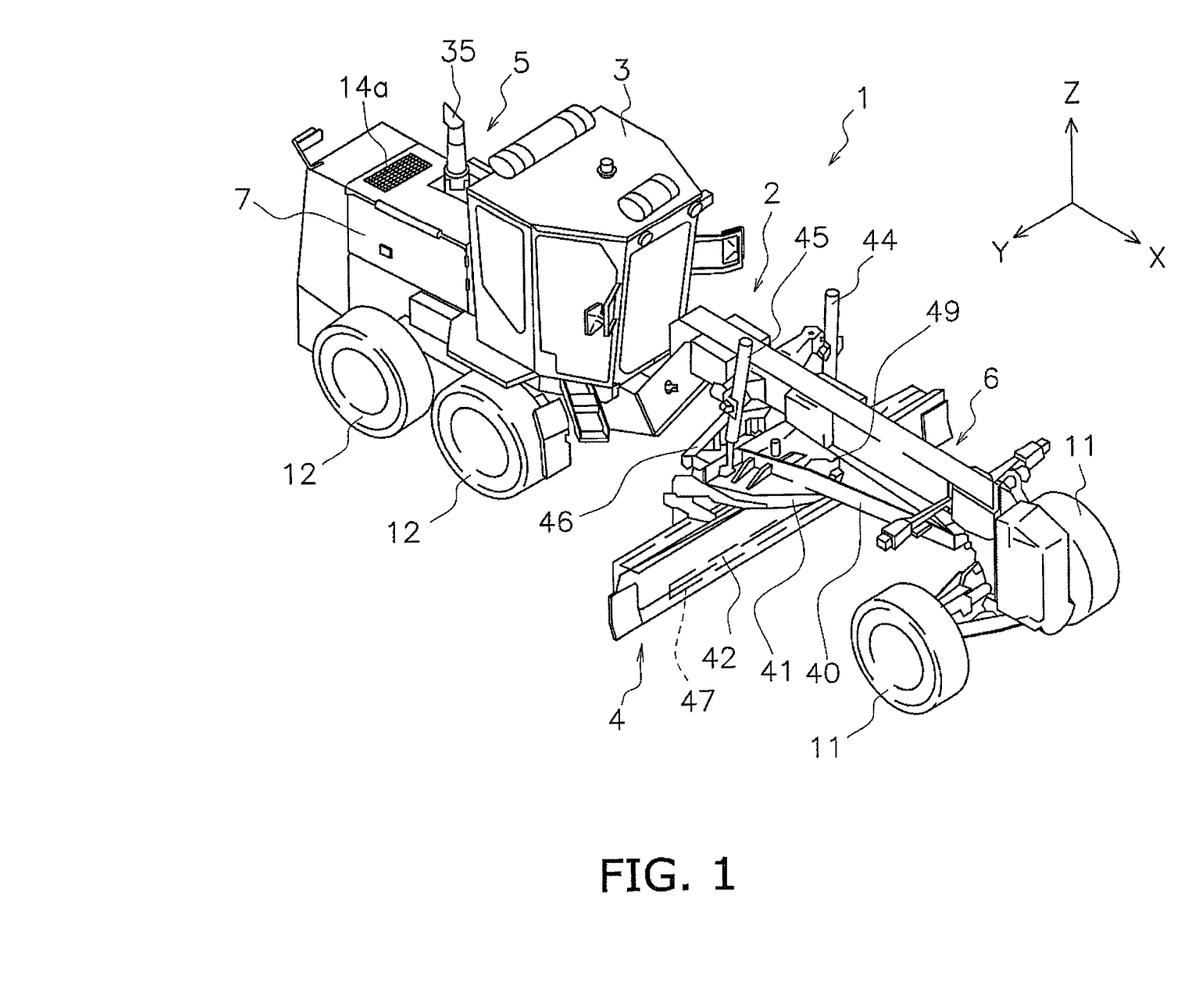
FIG. 1 is a perspective view of the external appearance of the motor grader.
Figure 2:
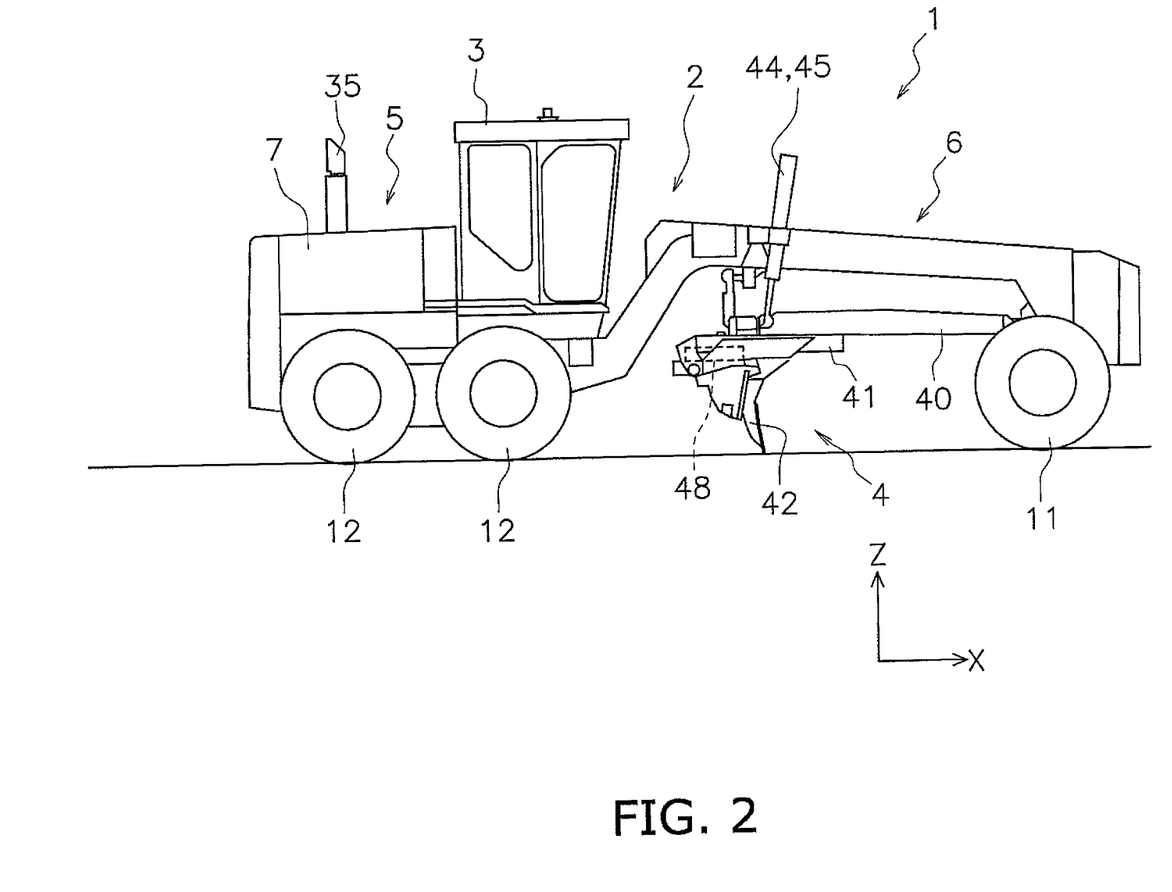
FIG. 2 is a side surface view of the motor grader.

Below, a motor grader 1 according to the embodiments will be described with reference to the drawings. FIG. 1 is a perspective view of the external appearance of the motor grader 1. FIG. 2 is a side surface view of the motor grader 1. The motor grader 1 is provided with a plurality of driving wheels which include front wheels 11 and rear wheels 12. It is possible for the motor grader 1 to perform ground leveling work, snow removal work, light cutting, material mixing, and the like using a blade 42 which is provided between the front wheels 11 and the rear wheels 12. As shown in FIG. 1 and FIG. 2, the motor grader 1 is provided with a vehicle body 2, a cab 3, and a work implement 4.

The vehicle body 2 includes a rear section vehicle body 5 and a front section vehicle body 6. The rear section vehicle body 5 has the rear wheels 12 described above. The motor grader 1 moves due to the rotational driving of these rear wheels 12 according to the driving force from the engine described later. In addition, the rear section vehicle body 5 has an engine compartment 7 which accommodates the engine. The configuration of an inner section of the engine compartment 7 will be described later.

The front section vehicle body 6 is arranged in front of the rear section vehicle body 5. The front section vehicle body 6 has the front wheels 11 described above. The front wheels 11 are arranged in the front section of the front section vehicle body 6.

The cab 3 is mounted to the rear section vehicle body 5. A handle, a gear change lever, and an operating section (which is not shown in the diagram) such as an operating lever of the work implement 4 are provided in an inner section of the cab 3. Here, in the present embodiment, front, back, left, and right have the meaning of front, back, left, and right as viewed by the driver inside the cab 3. In addition, in the diagrams, the front and back direction is shown as the X axis, the left and right direction is shown as the Y axis, and the up and down direction is shown as the Z axis.

The work implement 4 has a drawbar 40, a circle 41, the blade 42, a hydraulic motor 49, various types of hydraulic cylinders 44 to 48, and the like. The various types of hydraulic cylinders 44 to 48 include lift cylinders 44 and 45, a drawbar shift cylinder 46, a blade shift cylinder 47, and a tilt cylinder 48 (refer to FIG. 2). The hydraulic motor 49 and the hydraulic cylinders 44 to 48 are driven by hydraulic oil from a hydraulic pump which is not shown in the diagram.

The front section of the drawbar 40 is attached to the front section of the front section vehicle body 6 so as to be able to swing. Due to the synchronized expansion and contraction of a pair of lift cylinders 44 and 45, the rear section of the drawbar 40 is raised and lowered. In addition, the drawbar 40 swings while centering around an axis along the front and back direction due to the lift cylinders 44 and 45 expanding and contracting differently. Furthermore, the drawbar 40 moves to the left and right due to the expansion and contraction of the drawbar shift cylinder 46.

The circle 41 is attached to the rear section of the drawbar 40 so as to be able to rotate. The circle 41 is driven by the hydraulic motor 49 (refer to FIG. 1). Due to this, the circle 41 rotates in the clockwise direction or counterclockwise direction with regard to the drawbar 40 as seen from above the vehicle.

The blade 42 is supported so as to be able to slide in the left and right direction with regard to the circle 41. In addition, the blade 42 is supported to be able to swing while centering on a shaft which is parallel to the left and right direction with regard to the circle 41. The blade 42 moves left and right with regard to the circle 41 using the blade shift cylinder 47. In addition, the blade 42 swings while centering on a shaft which is parallel to the left and right direction with regard to the circle 41 using the tilt cylinder 48 (refer to FIG. 2). As described above, it is possible for the blade 42 to perform raising and lowering up and down, changing of the inclining with regard to the front and back direction, changing of the inclining with regard to the left and right direction, rotation, and shifting in the left and right direction via the drawbar 40 and the circle 41.

Figure 3:
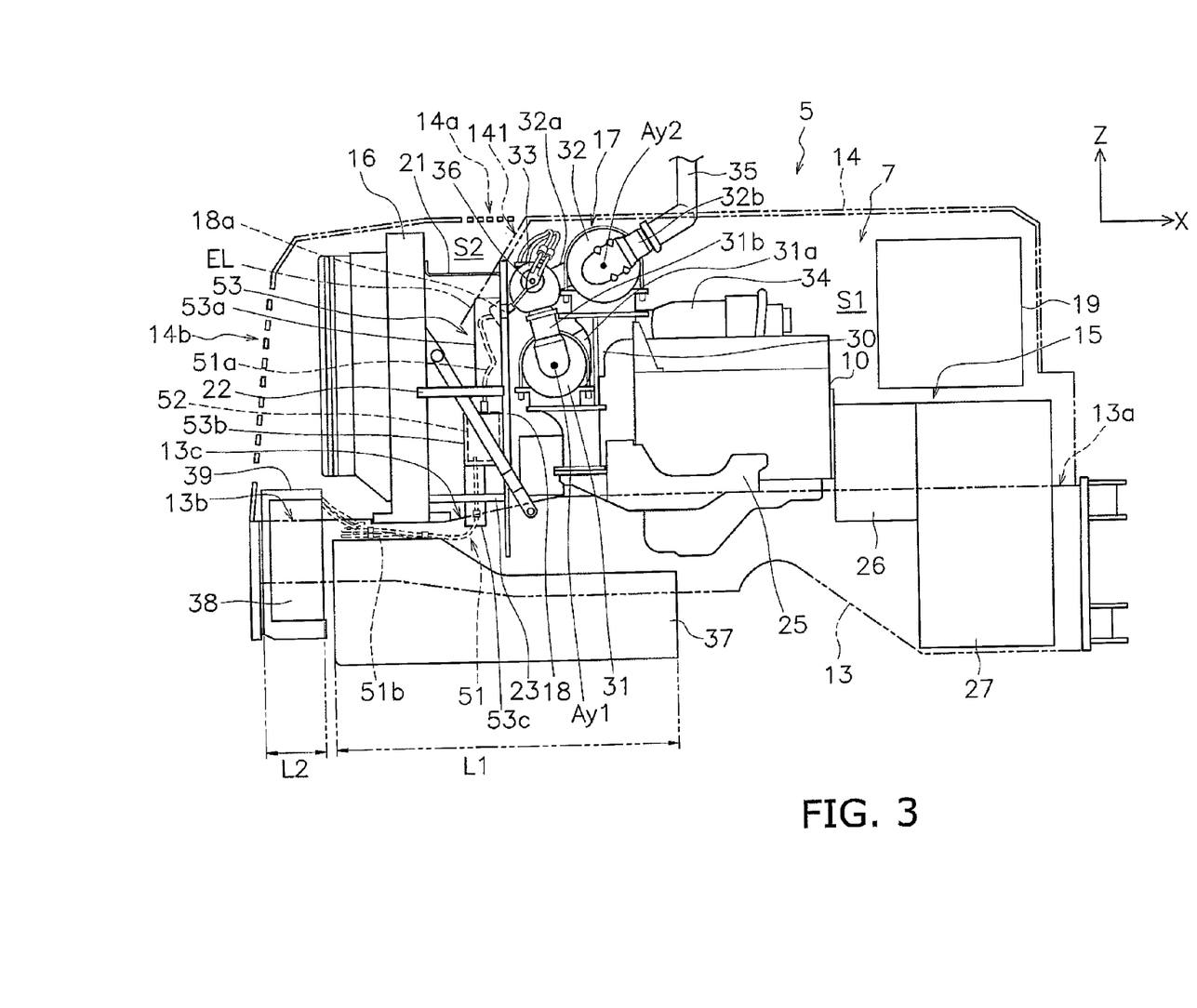
FIG. 3 is a side surface view of the configuration in an engine compartment of the motor grader.
Figure 4:
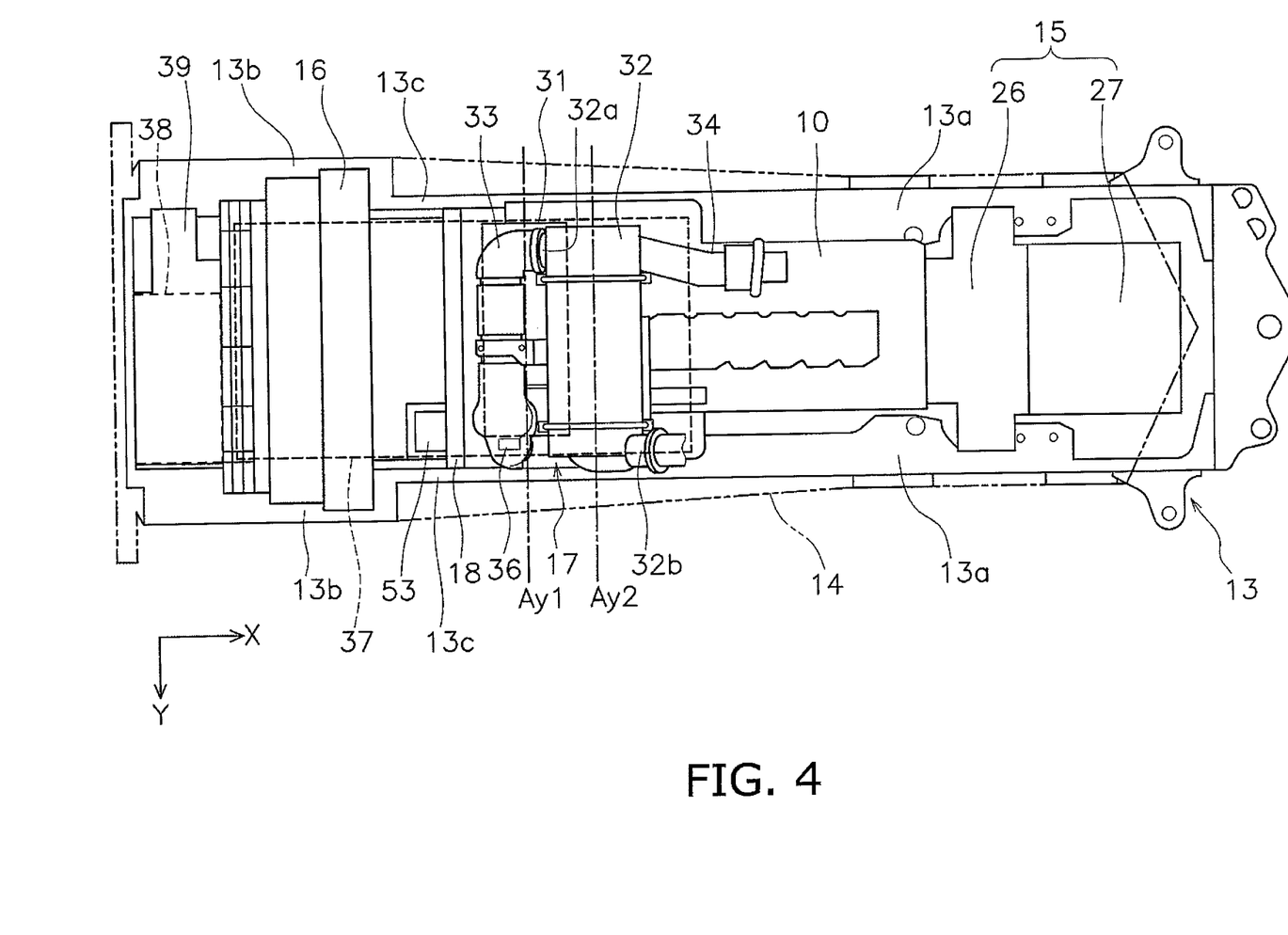
FIG. 4 is a top plan view of the configuration in the engine compartment.

FIG. 3 is a right side surface diagram of the inner configuration of the engine compartment 7. FIG. 4 is a planar diagram of the inner configuration of the engine compartment 7. As shown in FIG. 3 and FIG. 4, the rear section vehicle body 5 has a vehicle body frame 13 and a vehicle body cover 14. In FIG. 3, for convenience of description, the outer shapes of the vehicle body frame 13 and the vehicle body cover 14 are shown by a two-dot chain line. In addition, in FIG. 4, for convenience of description, the outer shape of the vehicle body cover 14 is shown by a two-dot chain line.

As shown in FIG. 3, the upper edge section of the vehicle body frame 13 has a first support section 13a, a second support section 13b, and a tapered section 13c. The first support section 13a is positioned forwards the second support section 13b. The tapered section 13c is positioned between the first support section 13a and the second support section 13b. The second support section 13b is positioned below the first support section 13a. The tapered section 13c is inclined obliquely downward and toward the rear. Here, the first support section 13a, the second support section 13b, and the tapered section 13c are provided to be substantially left and right symmetrical at both the left and right sides of the vehicle body frame 13.

The vehicle body cover 14 is attached to the vehicle body frame 13. The vehicle body cover 14 covers the engine compartment 7. In detail, the vehicle body cover 14 covers the top, the left, the right, and the rear of the engine compartment 7.

An engine 10, a power transmission apparatus 15, a radiator 16, an exhaust processing unit 17, a hydraulic oil tank 19, and the like are arranged in the engine compartment 7. The radiator 16, the exhaust processing unit 17, the engine 10, and the power transmission apparatus 15 are arranged in order from the rear of the vehicle toward the front of the vehicle. The hydraulic oil tank 19 is arranged above the power transmission apparatus 15. Here, the hydraulic oil tank 19 shown in FIG. 3 is omitted in FIG. 4 for ease of understanding.

The motor grader 1 is provided with a partition wall 18. The partition wall 18 is arranged between the engine 10 and the radiator 16 in the front and back direction. As shown in FIG. 3, the partition wall 18 partitions the inside section of the engine compartment 7 into a first accommodation space S1 and a second accommodation space S2. The partition wall 18 has a plate shape which extends in the up and down direction and the left and right direction. The partition wall 18 is supported by the radiator 16 through a plurality of support members 21 to 23. The exhaust processing unit 17, the engine 10, and the power transmission apparatus 15 are accommodated in the first accommodation space S1. The radiator 16 is accommodated in the second accommodation space S2.

The upper surface of the vehicle body cover 14 described above is provided with an upper section opening 14a. The upper section opening 14a is arranged above the second accommodation space S2 and is linked to the second accommodation space S2. The front edge section of the upper section opening 14a is positioned forwards the partition wall 18. The vehicle body cover 14 includes an inclined surface section 141. The inclined surface section 141 is provided to span across the front edge section of the upper section opening 14a and the upper end section of the partition wall 18. The inclined surface section 141 is inclined obliquely forward and upward.

A rear section opening 14b is provided in the rear surface of the vehicle body cover 14. The rear section opening 14b is positioned behind the radiator 16. The air outside the vehicle is taken from the upper section opening 14a into the second accommodation space S2. The air passes through the radiator 16 in the second accommodation space S2 and is discharged to the outside of the vehicle from the rear section opening 14b.

The engine 10 is supported by the vehicle body frame 13 via a mounting bracket 25. The mounting bracket 25 is attached to the first support section 13a.

The power transmission apparatus 15 transmits power from the engine 10. The power transmission apparatus 15 has a transmission 27 and a torque converter 26. The torque converter 26 is connected to the output side of the engine 10. The torque converter 26 transmits power from the engine 10 to the transmission 27. The transmission 27 is connected to the output side of the torque converter 26. The transmission 27 has a clutch, transmission gears, and the like which are not shown in the diagram. The transmission 27 transmits the power from the engine 10 to the rear wheels 12 through a final reduction gear and a tandem apparatus which are not shown in the diagram.

The radiator 16 cools the cooling water of the engine 10. The radiator 16 is arranged behind the engine 10 and the exhaust processing unit 17. In other words, the engine 10 and the exhaust processing unit 17 are arranged forwards the radiator 16. The radiator 16 is supported by the second support section 13b. That is, the radiator 16 is supported by the vehicle body frame 13 at a position which is lower than the supporting position of the engine 10.

The exhaust processing unit 17 has an exhaust processing apparatus support bracket 30, a first exhaust processing apparatus 31, a second exhaust processing apparatus 32, and a second connecting pipe 33. In addition, the motor grader 1 is further provided with a first connecting pipe 34 and an exhaust pipe 35. The first connecting pipe 34 is a pipe for feeding exhaust of the engine 10 into the exhaust processing unit 17. The exhaust pipe 35 is a pipe for discharging exhaust, which is processed in the exhaust processing unit 17, to the outside.

The exhaust processing apparatus support bracket 30 supports the first exhaust processing apparatus 31 and the second exhaust processing apparatus 32. The exhaust processing apparatus support bracket 30 is attached to the mounting bracket 25.

For example, the first exhaust processing apparatus 31 is a diesel particulate filter apparatus. The first exhaust processing apparatus 31 processes the exhaust from the engine 10 which is fed through the first connecting pipe 34. The first exhaust processing apparatus 31 captures the particulate matter which is included in the exhaust using a filter. The first exhaust processing apparatus 31 incinerates the captured particulate matter using a heater which is installed in the filter.

The first exhaust processing apparatus 31 has a substantially cylindrical outer shape. As shown in FIG. 4, the first exhaust processing apparatus 31 is arranged such that a center axis line Ay1 thereof is along the vehicle width direction. The first exhaust processing apparatus 31 has a first connecting port 31a and a second connecting port 31b. The first connecting pipe 34 is connected to the first connecting port 31a. The second connecting pipe 33 is connected to the second connecting port 31b.

The first connecting port 31a protrudes obliquely upward. Specifically, the first connecting port 31a protrudes obliquely upward and toward the engine 10 side. The bottom section of the first exhaust processing apparatus 31 is positioned below the highest position of the engine 10. The first exhaust processing apparatus 31 is arranged at a position which does not overlap with the engine 10 in planar view. In detail, the first exhaust processing apparatus 31 is arranged behind the engine 10. The first exhaust processing apparatus 31 is arranged between the engine 10 and the partition wall 18 in the front and back direction.

The second connecting port 31b protrudes substantially upward. However, the second connecting port 31b is slightly inclined toward the rear from the vertical direction. The second connecting pipe 33 is connected to the first exhaust processing apparatus 31 and the second exhaust processing apparatus 32. As shown in FIG. 3, the outer diameter of the second connecting pipe 33 is smaller than the outer diameter of the first exhaust processing apparatus 31. One end of the second connecting pipe 33 is connected to the second connecting port 31b of the first exhaust processing apparatus 31. The other end of the second connecting pipe 33 is connected to a third connecting port 32a of the second exhaust processing apparatus 32.

The second connecting pipe 33 is arranged above the first exhaust processing apparatus 31. In addition, the second connecting pipe 33 is arranged behind the second exhaust processing apparatus 32. The top section of the second connecting pipe 33 is positioned below the top section of the second exhaust processing apparatus 32. A reducing agent ejector 36 is attached to the second connecting pipe 33. The reducing agent ejector 36 ejects the reducing agent inside the second connecting pipe 33.

The second exhaust processing apparatus 32 is a selective catalytic reduction apparatus. The second exhaust processing apparatus 32 processes the exhaust from the engine 10 which is processed by the first exhaust processing apparatus 31. The second exhaust processing apparatus 32 selectively reduces the nitrogen oxide NOx using the reducing agent. For example, aqueous urea or the like is used as the reducing agent.

The second exhaust processing apparatus 32 has a substantially cylindrical outer shape. As shown in FIG. 4, the second exhaust processing apparatus 32 is arranged such that a center axis line Ay2 thereof is along the vehicle width direction. In addition, the second exhaust processing apparatus 32 is arranged such that the center axis line Ay2 is parallel to the center axis line Ay1 of the first exhaust processing apparatus 31. The second exhaust processing apparatus 32 is arranged above the first exhaust processing apparatus 31. In detail, the bottom section of the second exhaust processing apparatus 32 is arranged above the top section of the first exhaust processing apparatus 31. The second exhaust processing apparatus 32 is arranged to overlap a portion of the first exhaust processing apparatus 31 in planar view. In addition, the second exhaust processing apparatus 32 is arranged so as to overlap a portion of the engine 10 in planar view.

The second connecting pipe 33 and the reducing agent ejector 36 are arranged between the second exhaust processing apparatus 32 and the partition wall 18. The second connecting pipe 33 is arranged below the inclined surface section 141 described above. In other words, the inclined surface section 141 is arranged above the second connecting pipe 33. The second connecting pipe 33 and the reducing agent ejector 36 are arranged between the engine 10 and a reducing agent tank 38 which will be described later in the front and back direction.

The second exhaust processing apparatus 32 has the third connecting port 32a and a fourth connecting port 32b. The second connecting pipe 33 is connected to the third connecting port 32a. The exhaust pipe 35 is connected to the fourth connecting port 32b. The third connecting port 32a is inclined downward from the horizontal direction toward the rear.

The fourth connecting port 32b protrudes obliquely upward. Specifically, the fourth connecting port 32b protrudes upward and obliquely toward the engine 10 side. Due to this, the exhaust pipe 35 protrudes obliquely upward above the engine 10. The upper section of the exhaust pipe 35 protrudes upward from the vehicle body cover 14.

The engine 10, the first connecting pipe 34, the first exhaust processing apparatus 31, the second connecting pipe 33, the second exhaust processing apparatus 32, and the exhaust pipe 35 are connected in series in this order. Accordingly, the exhaust from the engine 10 passes through the first connecting pipe 34 and is fed into the first exhaust processing apparatus 31. In the first exhaust processing apparatus 31, particulate matter is mostly reduced from in the exhaust. Next, the exhaust passes through the second connecting pipe 33 and is fed into the second exhaust processing apparatus 32. In the second exhaust processing apparatus 32, the NOx is mostly reduced. Thereafter, the cleaned exhaust passes through the exhaust pipe 35 and is discharged to the outside.

A fuel tank 37 for retaining fuel and the reducing agent tank 38 for retaining the reducing agent are arranged below the engine compartment 7. The fuel tank 37 and the reducing agent tank 38 are arranged to protrude below the vehicle body frame 13. The fuel tank 37 is arranged so as to at least partially overlap with the engine 10 in planar view. The fuel tank 37 is arranged between the transmission 27 and the reducing agent tank 38 in the front and back direction. That is, the transmission 27 is arranged in front of the fuel tank 37. The reducing agent tank 38 is arranged behind the fuel tank 37. As shown in FIG. 3, a front and back length L1 of the fuel tank 37 is longer than a front and back length L2 of the reducing agent tank 38.

The reducing agent tank 38 is arranged behind the partition wall 18. The reducing agent tank 38 is arranged behind the radiator 16. The upper end section of the reducing agent tank 38 is positioned above the lower end section of the radiator 16. The upper end section of the reducing agent tank 38 is positioned above the upper end section of the fuel tank 37. The lower end section of the reducing agent tank 38 is positioned above the lower end section of the fuel tank 37. A top plate 39 is arranged above the reducing agent tank 38. Due to this, hot air from the radiator 16 does not directly hit the reducing agent tank 38 and the reducing agent is not easily heated.

As shown in FIG. 3, the reducing agent tank 38 and the second exhaust processing apparatus 32 are connected using a reducing agent hose 51. The reducing agent hose 51 is arranged so as to pass from the reducing agent tank 38, below the radiator 16, and extend to the front. The reducing agent hose 51 bends upward between the radiator 16 and the partition wall 18 and is arranged so as to extend in the up and down direction along the partition wall 18. The partition wall 18 has a through hole 18a, and the upper section of the reducing agent hose 51 passes through the through hole 18a and is connected to the reducing agent ejector 36 in the first accommodation space S1.

In detail, the reducing agent hose 51 has a first hose portion 51a and a second hose portion 51b. The first hose portion 51a is arranged along the partition wall 18 in the second accommodation space S2. The first hose portion 51a is arranged so as to extend in the up and down direction along the partition wall 18 in the second accommodation space S2. A reducing agent pump 52 is connected in the middle of the first hose portion 51a. The reducing agent pump 52 is attached to the partition wall 18 in second accommodation space S2.

The second hose portion 51b is arranged so as to pass below the radiator 16. The second hose portion 51b is arranged so as to pass above the fuel tank 37. That is, the second hose portion 51b is arranged so as to pass between the radiator 16 and the fuel tank 37.

Here, the through hole 18a of the partition wall 18 described above is positioned above the center position in the up and down direction of the partition wall 18. In addition, the distance in the up and down direction between the through hole 18a and the reducing agent ejector 36 is smaller than the distance in the up and down direction between the through hole 18a and the lower end portion of the radiator 16. Accordingly, the portion which is positioned in the first accommodation space S1 in the first hose portion 51a is shorter than the portion which is positioned in the second accommodation space S2 in the first hose portion 51a. As a result, the portion which is exposed to a high temperature environment in the first accommodation space S1 in the reducing agent hose 51 is shortened.

Figure 5:
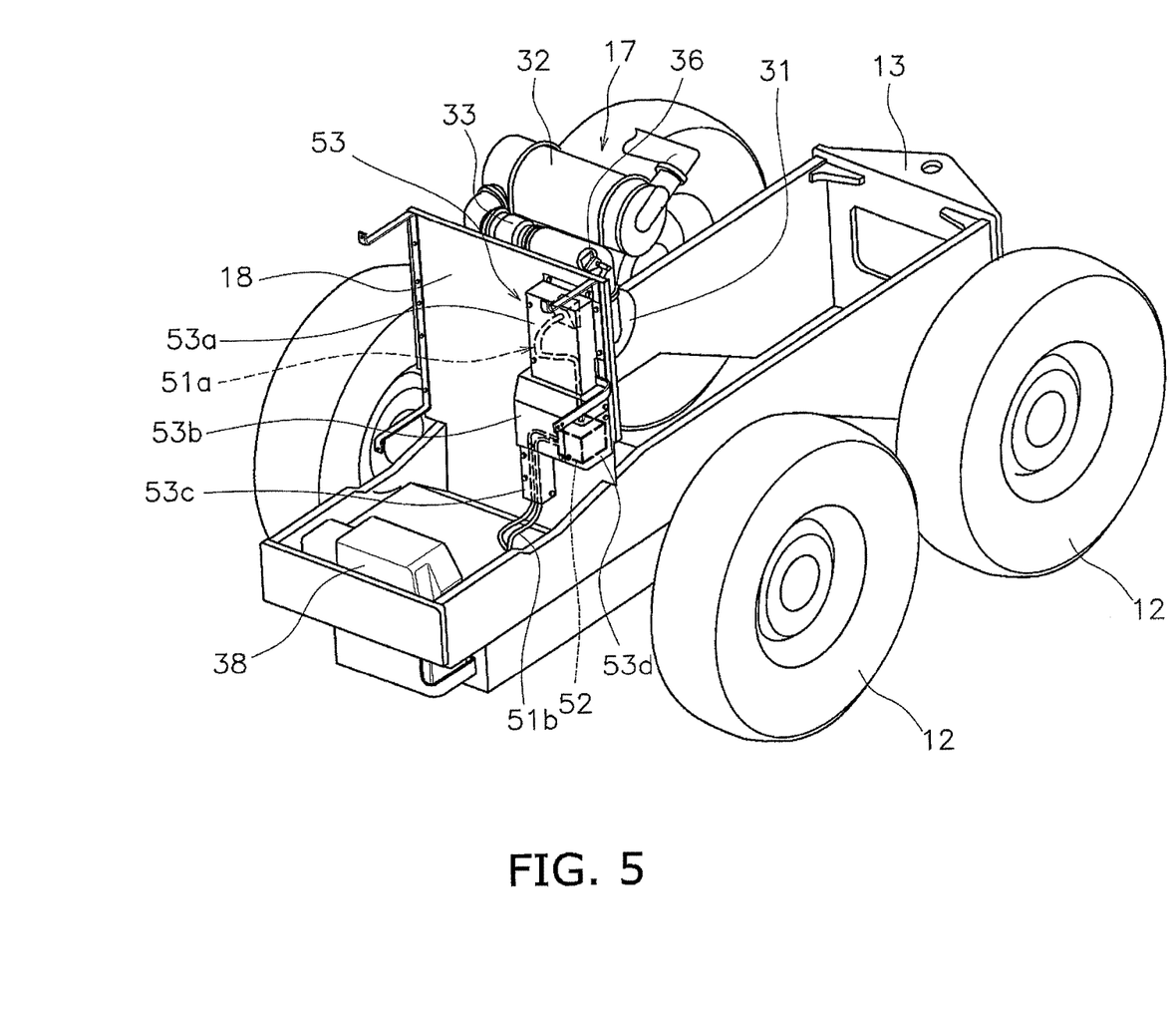
FIG. 5 is a perspective view of the configuration in the engine compartment.

FIG. 5 is a perspective view showing a portion of the configuration of the engine compartment 7. As shown in FIG. 3 and FIG. 5, the motor grader 1 has a cover member 53. The cover member 53 covers at least a portion of the reducing agent hose 51 in the second accommodation space S2. In detail, the cover member 53 covers the first hose portion 51a and the reducing agent pump 52. In addition, the cover member 53 covers the through hole 18a of the partition wall 18 described above. The cover member 53 is attached to the partition wall 18. As shown in FIG. 3, the cover member 53 is positioned on the lower side of a virtual extended line EL of the inclined surface section 141 in a side view.

In detail, the cover member 53 has a first cover section 53a, a second cover section 53b, and a third cover section 53c. The first cover section 53a covers the through hole 18a of the partition wall 18 and the upper section of the first hose portion 51a. The upper section of the first hose portion 51a is a portion which is positioned above the reducing agent pump 52 in the first hose portion 51a. The second cover section 53b is arranged below the first cover section 53a. The second cover section 53b covers the reducing agent pump 52. The second cover section 53b has a lid 53d. The lid 53d is attached with regard to the other portions of the second cover section 53b so as to be able to be attached and detached. Due to this, the access to the reducing agent pump 52 is easy and the maintenance of the reducing agent pump 52 is easy.

The third cover section 53c is arranged below the second cover section 53b. The third cover section 53c covers the lower section of the first hose portion 51a. The lower section of the first hose portion 51a is a portion which is positioned below the reducing agent pump 52 in the first hose portion 51a. The third cover section 53c extends up to a position below the upper edge section of the vehicle body frame 13. In detail, the lower end section of the third cover section 53c is positioned below the tapered section 13c of the vehicle body frame 13. The lower end section of the third cover section 53c is positioned below the lower end section of the radiator 16.

The motor grader 1 according to the present embodiment has the following characteristics.

The fuel tank 37 is arranged between the power transmission apparatus 15 and the reducing agent tank 38 in the front and back direction. In addition, the fuel tank 37 is arranged so as to at least partially overlap with the engine 10 in planar view. Accordingly, at least a portion of the fuel tank 37 is positioned between the engine 10 and the reducing agent tank 38 in the front and back direction. As a result, the reducing agent tank 38 is arranged to be separated from the engine 10. Due to this, it is possible to suppress an excessive increase in the temperature of the reducing agent. In addition, it is possible to suppress an excessive decrease in the temperature of the reducing agent using the heat from the fuel tank 37. Furthermore, the reducing agent tank 38 and the power transmission apparatus 15 are arranged on sides which are opposite to each other with regard to the fuel tank 37. As a result, it is possible to avoid the power transmission apparatus 15 becoming an obstacle to the layout of the reducing agent tank 38.

The front and back length L1 of the fuel tank 37 is longer than the front and back length L2 of the reducing agent tank 38. As a result, the reducing agent tank 38 is arranged to be further separated from the engine 10. Due to this, it is possible to suppress an excessive increase in the temperature of the reducing agent.

The second connecting pipe 33 and the reducing agent ejector 36 are arranged between the engine 10 and the reducing agent tank 38 in the front and back direction. Due to this, it is possible to shorten the length of the reducing agent hose 51.

Above, an embodiment of the present invention has been described but the present invention is not limited to the embodiment described above and various modifications are possible in a scope which does not depart from the gist of the invention.

The configuration of the exhaust processing unit 17 is not limited to the configuration described above. For example, the first exhaust processing apparatus 31 may be an apparatus which is different to the diesel particulate filter apparatus. Alternatively, the first exhaust processing apparatus 31 may be omitted. The second exhaust processing apparatus 32 may use a reducing agent other than aqueous urea.

The positions of the first exhaust processing apparatus 31 and the second exhaust processing apparatus 32 are not limited to the positions described above. For example, the first exhaust processing apparatus 31 may be arranged above the second exhaust processing apparatus 32. Alternatively, the second exhaust processing apparatus 32 may be arranged behind the first exhaust processing apparatus 31.

The reducing agent tank 38 is not limited to being behind the radiator 16 and may be arranged at another position. For example, the reducing agent tank 38 may be arranged below the radiator 16.

The second connecting pipe 33 and the reducing agent ejection apparatus 36 are not limited to being between the second exhaust processing apparatus 32 and the partition wall 18 and may be arranged at another position. However, in order to shorten the portion which is arranged in the first accommodation space S1 in the reducing agent hose 51, it is preferable that the second connecting pipe 33 and the reducing agent ejection apparatus 36 be arranged between the second exhaust processing apparatus 32 and the partition wall 18.

In the embodiment described above, a portion of the fuel tank 37 overlaps with the engine 10 in planar view. However, the whole of the fuel tank 37 may overlap with the engine 10.

In the embodiment described above, the reducing agent tank 38 is arranged behind the fuel tank 37 and the power transmission apparatus 15 is arranged in front of the fuel tank 37. However, the reducing agent tank 38 may be arranged in front of the fuel tank 37 and the power transmission apparatus 15 may be arranged behind the fuel tank 37.

INDUSTRIAL APPLICABILITY

According to the present invention, it is possible to provide a motor grader where it is possible to suppress an excessive increase and an excessive decrease in the temperature of the reducing agent.

The invention claimed is:

1. A motor grader comprising:
an engine;
a transmission configured to transmit power from the engine;
a selective catalytic reduction catalyst configured to process exhaust from the engine;
a fuel tank configured to retain fuel, the fuel tank being disposed below the engine;
a partition wall arranged rearward of the engine in a vehicle front to back direction; and
a reducing agent tank configured to retain a reducing agent,
the fuel tank being arranged so as to at least partially overlap with the engine in a top plan view,
the fuel tank being arranged between the transmission and the reducing agent tank in the vehicle front to back direction, such that the fuel tank is non-overlapping with respect to the transmission and the reducing agent in the top plan view, and
the partition wall being disposed between the reducing agent tank and the engine in the vehicle front to back direction.

2. The motor grader according to claim 1, wherein a front to back length of the fuel tank is longer than a front to back length of the reducing agent tank.

3. The motor grader according to any one of claim 2, further comprising:
a connecting pipe connected to the selective catalytic reduction catalyst, the connecting pipe being configured to pass the exhaust from the engine therethrough; and a reducing agent ejector attached to the connecting pipe, the reducing agent ejector being configured to eject the reducing agent from the reducing agent tank into the connecting pipe, the connecting pipe and the reducing agent ejector being arranged between the engine and the reducing agent tank in the vehicle front to back direction.

4. The motor grader according to claim 1, wherein the reducing agent tank is arranged behind the fuel tank, and the transmission is arranged in front of the fuel tank.

5. The motor grader according to any one of claim 4, further comprising:

a connecting pipe connected to the selective catalytic reduction catalyst, the connecting pipe being configured to pass the exhaust from the engine therethrough; and a reducing agent ejector attached to the connecting pipe, the reducing agent ejector being configured to eject the reducing agent from the reducing agent tank into the connecting pipe, the connecting pipe and the reducing agent ejector being arranged between the engine and the reducing agent tank in the vehicle front to back direction.

6. The motor grader according to claim 1, wherein the reducing agent tank is arranged in front of the fuel tank, and the transmission is arranged behind the fuel tank.

7. The motor grader according to any one of claim 6, further comprising:

a connecting pipe connected to the selective catalytic reduction catalyst, the connecting pipe being configured to pass the exhaust from the engine therethrough; and a reducing agent ejector attached to the connecting pipe, the reducing agent ejector being configured to eject the reducing agent from the reducing agent tank into the connecting pipe, the connecting pipe and the reducing agent ejector being arranged between the engine and the reducing agent tank in the vehicle front to back direction.

8. The motor grader according to claim 1, further comprising:

a connecting pipe connected to the selective catalytic reduction catalyst, the connecting pipe being configured to pass the exhaust from the engine therethrough; and a reducing agent ejector attached to the connecting pipe, the reducing agent ejector being configured to eject the reducing agent from the reducing agent tank into the connecting pipe, the connecting pipe and the reducing agent ejector being arranged between the engine and the reducing agent tank in the vehicle front to back direction.

9. The motor grader according to claim 8, wherein the reducing agent tank and the reducing agent ejector are connected by a reducing agent hose.

10. The motor grader according to claim 1, wherein the reducing agent tank and the selective catalytic reduction catalyst are connected by a reducing agent hose.

11. The motor grader according to claim 1, further comprising a torque converter.

12. The motor grader according to claim 1, further comprising a radiator arranged rearward of the engine in the vehicle front to back direction, the radiator being disposed between the engine and the reducing agent tank in the vehicle front to back direction.

13. A motor grader comprising:

an engine;

a transmission configured to transmit power from the engine;

a selective catalytic reduction catalyst configured to process exhaust from the engine;

a fuel tank configured to retain fuel, the fuel tank being disposed below the engine;

a partition wall arranged rearward of the engine in a vehicle front to back direction; and a reducing agent tank configured to retain a reducing agent, the fuel tank being arranged so as to at least partially overlap with the engine in a top plan view, the fuel tank being arranged between the transmission and the reducing agent tank in the vehicle front to back direction, and the partition wall being disposed between the reducing agent tank and the engine in the vehicle front to back direction.

14. The motor grader according to claim 13, wherein at least a portion of the fuel tank and at least a portion of the reducing agent tank are arranged at the same height in a vertical direction of the motor grader.

15. The motor grader according to claim 13, wherein at least a portion of the fuel tank and at least a portion of the transmission are arranged at the same height in a vertical direction of the motor grader.

16. The motor grader according to claim 15, wherein at least a portion of the fuel tank and at least a portion of the reducing agent tank are arranged at the same height in a vertical direction of the motor grader.

17. The motor grader according to claim 16, wherein the fuel tank is non-overlapping with respect to the transmission and the reducing agent in the top plan view.

18. The motor grader according to claim 13, wherein at least a portion of the transmission and at least a portion of the reducing agent tank are arranged at the same height in a vertical direction of the motor grader.

19. The motor grader according to claim 13, wherein the fuel tank is non-overlapping with respect to the transmission and the reducing agent in the top plan view.

20. The motor grader according to claim 13, further comprising a radiator, the fuel tank being arranged below the radiator.

21. The motor grader according to claim 20, wherein the reducing agent tank is arranged adjacent to the fuel tank and a plate member is disposed above the reducing agent tank.

22. The motor grader according to claim 13, further comprising a radiator arranged rearward of the engine in the vehicle front to back direction, the radiator being disposed between the engine and the reducing agent tank in the vehicle front to back direction.

23. A motor grader comprising:

an engine;

a transmission configured to transmit power from the engine;

a selective catalytic reduction catalyst configured to process exhaust from the engine;

a fuel tank configured to retain fuel;

a partition wall arranged rearward of the engine in a vehicle front to back direction; and a reducing agent tank configured to retain a reducing agent, the fuel tank being arranged so as to at least partially overlap with the engine in a top plan view, the fuel tank being arranged between the transmission and the reducing agent tank in the vehicle front to back direction, at least a portion of the transmission, at least a portion the fuel tank, and at least a portion of the reducing agent tank being arranged at the same height in a vertical direction of the motor grader, and the partition wall being disposed between the reducing agent tank and the engine in the vehicle front to back direction.

24. The motor grader according to claim 23, further comprising a radiator arranged rearward of the engine in the vehicle front to back direction, the radiator being disposed between the engine and the reducing agent tank in the vehicle front to back direction.

* * * * *